United States Patent Office 2,900,595
Patented Aug. 18, 1959

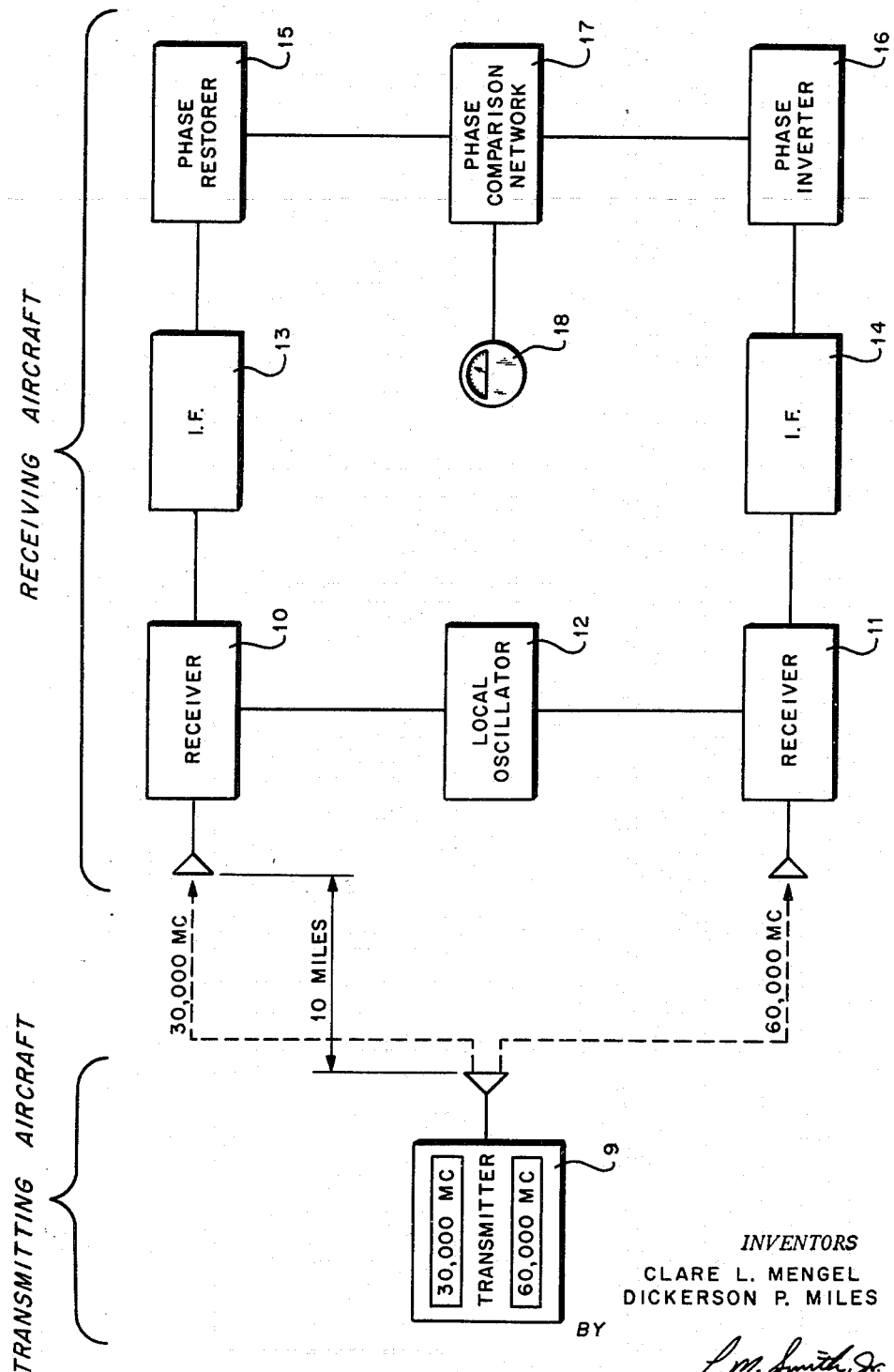

2,900,595

MAGNETIC FIELD DETECTOR

Clare L. Mengel, Sellersville, and Dickerson P. Miles, Oreland, Pa.

Application August 31, 1955, Serial No. 531,854

7 Claims. (Cl. 324—6)

(Granted under Title 35, U.S. Code (1952), sec. 266)

The invention described herein may be manufactured and used by or for the Government of the United States of America for governmental purposes without the payment of any royalties thereon or therefor.

The present invention relates to a method and apparatus for detecting anomalies in the earth's magnetic field and more particularly to a method and apparatus for indicating the presence of a submarine or other target capable of creating an anomaly in the earth's magnetic field.

Present techniques used in searching large areas of the earth for changes in the magnetic field generally consist of moving the detection instruments from point to point in the magnetic field. The disadvantages of this method when used to search an area are that it is slow, expensive, and unsuitable for covering large expanses such as oceans.

The present invention proposes to detect the presence of anomalies in the earth's magnetic field by employing airborne equipment to sweep large areas at a time permitting rapid movement from place to place. The invention employs two airplanes travelling parallel paths separated by a predetermined distance. The first of these two airplanes sends out two microwave radio beams at different wave lengths which are affected to different extents by the earth's magnetic field, relying on the Faraday, Zeeman and Voigt effects. By measuring the difference in phase shifts between the two microwave frequency signals which are received by the second airplane, it is possible to evaluate changes in the magnetic field indicating the presence of a submarine or other target capable of creating an anomaly in the earth's magnetic field.

An object of the present invention is the provision of a method and arrangement for remotely scanning wide geographical areas for the purpose of detecting anomalies in the earth's magnetic field.

A further object of the invention is the provision of a method and apparatus for using aircraft in the detection of the presence of a submarine or other target capable of creating an anomaly in the earth's magnetic field.

Still another object is to provide a method and apparatus for utilizing a pair of transmitted radio waves through an area for detecting anomalies in the earth's magnetic field.

A final object of the present invention is the provision of radio equipment for transmitting and receiving two signals at frequencies which respond differently to changes in the earth's magnetic field and comparing said two signals for differences in phase caused by anomalies in the earth's magnetic field in the area swept by said signals.

The exact nature of this invention as well as other objects and advantages thereof will be readily apparent from consideration of the following specification relating to the annexed drawing in which is shown schematically the arrangement for carrying out the method of this invention.

The present invention employs two beams of RF energy at separate microwave frequencies. The speed of the two beams depends, as is well understood, on the index of refraction of the intervening medium. The index of refraction for the medium may vary over a range of frequencies. If one of the frequencies chosen is affected in its speed of travel by the earth's magnetic field to a greater extent than the other frequency is affected, then it is possible to measure the magnetic field between the point of transmission and the point of reception of the signals by comparing the phases of the signals at the point of reception. In the present method and arrangement, one frequency is chosen at 30,000 megacycles which is defined as the reference wave and the second frequency chosen is the second harmonic of the 30,000 megacycle signal, that is, 60,000 megacycles. The latter frequency is affected more sharply by the earth's magnetic field than the reference wave. In the region of 60,000 megacycles there is an oxygen molecule absorption band, and since oxygen makes up approximately 20 percent of the earth's atmosphere, considerable energy is absorbed from the radiated beam in this band. This results in an accentuation of the magnetic field's effect on the refractive index of the medium.

In applying the above principles, it should be readily apparent that when an area is scanned by the reference and harmonic frequency waves, a phase difference between the two signals over a given distance will occur which can be defined as normal. By continuing the sweep, a distinct shift in this phase difference will indicate, according to this invention, that an anomaly in the earth's magnetic field exists somewhere in area swept. The equipment can be adjusted for a zero reading at the expected phase difference for the considered normal field of the earth between two points. Definite signals indicating shifts in phase thereby detect the presence of a target or other object capable of producing an anomaly in the earth's magnetic field. This method, of course, does not pinpoint the exact location of the target nor does it point out the exact nature of the cause of the anomaly. However, further investigation should provide the information sought.

Referring to the drawing showing schematically an arrangement which is an illustrative embodiment of the specific apparatus that will perform the method of the instant invention there is shown a pair of aircraft consisting of a transmitting aircraft and a receiving aircraft flying parallel to each other at some predetermined distance apart, such as 10 miles. The transmitting aircraft may hold transmitting apparatus 9 capable of transmitting a signal of given frequency and a second harmonic of that signal. For example, the transmitting aircraft, as indicated in the drawing, may emit a first signal at 30,000 megacycles and a second signal at 60,000 megacycles, these frequencies having been found most desirable for the purpose of the invention. Other frequencies, having desirable properties, may of course be chosen instead. The 30,000 and 60,000 megacycle signals are received by the receiving aircraft in separate receivers, 10 and 11, respectively. According to the principles of this invention, the 30,000 megacycle signal is only slightly affected in phase by the earth's magnetic field while the 60,000 megacycle signal is appreciably shifted in phase, for reasons explained above. A local oscillator 12 may supply a signal intermediate the original two signals, as for example, a signal at 45,000 megacycles. This intermediate signal may be beat with the two incoming signals received respectively at receivers 10 and 11 producing a pair of intermediate frequencies at 15,000 megacycles each, which may be fed into a pair of intermediate frequency amplifiers, indicated at 13 and 14, respectively. One intermediate frequency signal may be then fed through a phase inverter 16 wherein the signal is shifted 180° in phase from its original phase. The other intermediate frequency signal may be fed through a phase restorer 15 to take care of normal shifts of phase due to the earth's magnetic field and other distortion effects. A phase comparison network 17 compares the two intermediate frequency signals which cancel each other out when exactly 180° out of phase. A reading on voltmeter 18 indicates a phase difference other than 180°. In operation of this arrangement the transmitting aircraft and the receiving aircraft may be flown at a distance of 10 miles apart and phase restorer 15 adjusted to present a zero voltage output at 18 in the presence of only the earth's magnetic field at a particular locality.

In the presence of a submarine or other target capable of creating an anomaly in the earth's magnetic field, the 30,000 megacycle signal and 60,000 megacycle signal will be received by receivers 10 and 11, as already explained. However, the 60,000 megacycle signal will be shifted in phase to a far greater extent than the 30,000 megacycle signal in the presence of such an anomaly for the reasons already explained. Therefore, at the phase comparison network 17 the 60,000 megacycle signal which has been reduced to an intermediate frequency signal at 15,000 megacycles will show a greater shifting from the origin than the 30,000 megacycle signal and, therefore, a voltage different from zero will occur at the output of the phase comparison network. This voltage will serve to move the indicator of the voltmeter 18, thereby indicating presence of an anomaly in the magnetic field between the two aircraft and the probable presence of a submarine in that area.

It is understood that the present invention is a highly efficient manner of sweeping large areas quickly and efficiently for locating the probable presence of submarines. This method as presently envisioned would not necessarily supplant the present submarine detection equipment for pinpointing a submarine for destruction. However, the present invention by virtue of its simplicity, efficiency and ability to sweep large areas to detect the probable presence of a submarine or other target such as surface vehicles in time of fog, permits a more efficient screening of convoys and prevents submarines from coming close enough to wreak havoc on surface craft.

Obviously, other means for detecting the difference in effect of anomalies in the earth's magnetic field are possible without deviating from the instant invention. The arrangement shown is merely an illustrative embodiment of the arrangement for detecting the preferential phase shift occurring on the higher frequency signal. Alternate schemes might include the modulation of one RF carrier by another lower frequency carrier and creating two side bands, one which falls in an absorption and another outside the absorption band, the measurement being by similar techniques. Also, other vehicles or stations in addition to aircraft may be used to carry the equipment.

Thus, it is apparent that herein is proposed a new and a more efficient method and apparatus for searching the earth's magnetic field for anomalies or changes in the earth's magnetic field by radio frequency propagation and the corresponding effect that the earth's magnetic field and changes thereof has on radio frequency propagation. Of course, with proper calibration of equipment, the apparatus and method of this invention may be used to integrate the magnitude of the earth's magnetic field between the sending and receiving points.

Obviously, many modifications and variations of the present invention are possible in the light of the above teachings. It is, therefore, to be understood that within the scope of the appended claims the invention may be practiced otherwise than as specifically described.

What is claimed is:

1. Apparatus for detecting anomalies in the earth's magnetic field indicating presence of a submarine target comprising means to radiate a microwave frequency signal from a first point in the earth's magnetic field, means to radiate a second signal at a different microwave frequency from said first point, means to receive said first and second signals at a second point remotely removed from said first point, means to convert said signals into first and second intermediate frequency signals of identical frequency, means to shift one of said intermediate frequency signals 180° in phase, means to compare phases of said intermediate frequency signals, means to adjust the phase of the other of said intermediate frequency signals causing zero phase difference in said intermediate frequency signals when said earth's magnetic field is considered normal, and means to indicate further unequal phase shifting in said signals caused by anomalies in the earth's magnetic field.

2. Apparatus for indicating anomalies in the earth's magnetic field comprising a first point and a second point in the earth's magnetic field separated by a predetermined distance, a first microwave transmitting means located at said first point for radiating a first microwave frequency signal in a band which is only slightly affected by changes in said magnetic field, a second microwave transmitting means located at said first point for radiating a second microwave frequency signal simultaneously in phase with said first signal and in an absorption band highly sensitive to changes in said magnetic field causing deviation of the refractive index of the medium in said band, a first microwave receiving means located at said second point for receiving said first signal and reducing said first signal to a third signal at a given predetermined intermediate frequency, a second microwave receiving means located at said second point for receiving said second signal and reducing said second signal to a fourth signal at said given intermediate frequency, means comparing the phases of said intermediate frequency signals, means recording the difference in said phases, and means for moving one of said two points for sweeping an area of the earth with said transmitted signals causing a reading on said recording means indicative of the magnitude of said earth's magnetic field in said area.

3. Apparatus for indicating anomalies in the earth's magnetic field comprising a first point and a second point in the earth's magnetic field separated by a predetermined distance, a first microwave transmitting means located at said first point for radiating a first microwave frequency signal in a band which is only slightly affected by changes in said magnetic field, a second microwave transmitting means located at said first point for radiating a second microwave frequency signal simultaneously with said first signal and in an absorption band highly sensitive to changes in said magnetic field causing deviation of the refractive index of the medium in said band, a first microwave receiving means located at said second point for receiving said first signal and reducing said first signal to a third signal at a given predetermined intermediate frequency, a second microwave receiving means located at said second point for receiving said second signal and reducing said second signal to a fourth signal at said given intermediate frequency, means comparing the phases of said intermediate frequency signals, means recording the difference in said phases, means correcting the phase of one of said intermediate frequency signals to match the phase of the other of said intermediate frequency signals causing a zero reading on said reading means for indicating a chosen normal intensity of magnetic field between said two points, and means for moving one of said two points for sweeping an area of the earth with said transmitted signals causing a reading other than zero on said recording means when an anomaly in said earth's magnetic field separating said two points is swept.

4. A method of detecting submarines comprising the steps of simultaneously radiating two signals at two different microwave frequencies, one of the frequencies being a second harmonic of the other frequency, receiving said signals at a point removed from said source of signals, comparing the phase shift of each of said signals, and producing a signal proportional to the relative phase shift of said two signals for indicating changes in the earth's magnetic field swept by said radiated signals.

5. A method for integrating the magnitude of the earth's magnetic field between a first and second point in said field comprising the steps of radiating from said first point a first microwave frequency signal simultaneously with a second microwave frequency signal in a portion of the microwave frequency band more sensitive to changes in intensity of said magnetic field than said first signal and said second signal being a second harmonic of said first signal, receiving said first and second signals at said second point, and comparing the phases of said received signals for indicating relative phase shifting in both of said signals due to the intensity of the magnetic field separating said points.

6. A method for integrating the magnitude of the earth's magnetic field between a first and second point in said field comprising the steps of radiating from said first point a first microwave frequency signal simultaneously with a second microwave frequency signal in a portion of the microwave frequency band more sensitive to changes in intensity of said magnetic field than said first signal and said second signal being a second harmonic of said first signal, receiving said first and second signals at said second point, adjusting the phase of one of said signals to be in fixed relation relative to the phase of the other of said signals when the area between the two said points has an earth's magnetic field which is considered normal, moving at least one of said points to sweep an area with said signals, and comparing the phases of said received signals for indicating relative phase shifting in said signals due to changes in the magnitude of the mangetic field swept by said signals.

7. Apparatus for detecting anomalies in the earth's magnetic field indicating presence of a submarine target comprising means to radiate a first microwave frequency signal from a first point in the earth's magnetic field, means to radiate from said first point a second microwave signal being a harmonic of said first signal, means to receive said first and second signals at a second point, means to compare phase shift of said first signal with that of said second signal caused by the earth's magnetic field, and means to indicate departure from normal phase shift difference due to anomalies in said earth's magnetic field.

References Cited in the file of this patent

UNITED STATES PATENTS

| | | |
|---|---|---|
| 1,816,579 | Hammond | July 28, 1931 |
| 2,426,918 | Barret | Sept. 2, 1947 |
| 2,526,425 | Schultheis | Oct. 17, 1950 |
| 2,582,350 | O'Brien | Jan. 15, 1952 |
| 2,623,924 | Cartier | Dec. 30, 1952 |
| 2,642,477 | Puranan | June 16, 1953 |
| 2,794,949 | Hedstrom | June 4, 1957 |

FOREIGN PATENTS

| | | |
|---|---|---|
| 507,468 | Canada | Nov. 23, 1954 |

UNITED STATES PATENT OFFICE

CERTIFICATE OF CORRECTION

Patent No. 2,900,595

August 18, 1959

Clare L. Mengel et al.

It is hereby certified that error appears in the printed specification of the above numbered patent requiring correction and that the said Letters Patent should read as corrected below.

Column 4, line 24, claim 2, strike out "in phase"; line 64, claim 3, for "reading", second occurrence, read -- recording --; column 6, line 5, claim 6, for "mangetic" read -- magnetic --.

Signed and sealed this 12th day of July 1960.

(SEAL)
Attest:

KARL H. AXLINE
Attesting Officer

ROBERT C. WATSON
Commissioner of Patents